(12) United States Patent
Amanullah et al.

(10) Patent No.: US 10,731,068 B2
(45) Date of Patent: Aug. 4, 2020

(54) HYBRID PARTICLE MIX FOR SEAL AND PLUG QUALITY ENHANCEMENT

(71) Applicant: Saudi Arabian Oil Company, Dhahran (SA)

(72) Inventors: Md Amanullah, Dhahran (SA); Mohammed K. Arfaj, Dammam (SA); Turki Alsubaie, Alkhobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/262,411

(22) Filed: Jan. 30, 2019

(65) Prior Publication Data

US 2019/0241788 A1 Aug. 8, 2019

Related U.S. Application Data

(62) Division of application No. 15/889,668, filed on Feb. 6, 2018.

(51) Int. Cl.
| | |
|---|---|
| *C09K 8/035* | (2006.01) |
| *E21B 33/14* | (2006.01) |
| *E21B 21/00* | (2006.01) |
| *C09K 8/506* | (2006.01) |

(52) U.S. Cl.
CPC .............. *C09K 8/035* (2013.01); *C09K 8/506* (2013.01); *E21B 21/003* (2013.01); *E21B 33/14* (2013.01)

(58) Field of Classification Search
CPC ...................................................... C09K 8/03
See application file for complete search history.

(56) References Cited

U.S. PATENT DOCUMENTS

| | | |
|---|---|---|
| 2,483,936 A | 10/1949 | Roberts |
| 2,600,404 A | 6/1952 | Hoeppel |
| 2,749,308 A | 6/1956 | Beckum et al. |
| 2,779,417 A | 1/1957 | Clark, Jr. et al. |
| 2,789,948 A | 4/1957 | Tronolone |
| 2,811,488 A | 10/1957 | Nestle et al. |
| 2,912,380 A | 11/1959 | Groves |

(Continued)

FOREIGN PATENT DOCUMENTS

| | | |
|---|---|---|
| CN | 101311243 A | 11/2008 |
| CN | 101724383 A | 6/2010 |

(Continued)

OTHER PUBLICATIONS

Wajheeuddin et al. An Experimental Study on Particle Sizing of Natural Substitutes for Drilling Fluid Applications, 2014.*

(Continued)

*Primary Examiner* — William D Hutton, Jr.
*Assistant Examiner* — Avi T Skaist
(74) *Attorney, Agent, or Firm* — Bracewell LLP; Constance G. Rhebergen; Brian H. Tompkins (57) ABSTRACT

A hybrid particle mix lost circulation material (LCM) is provided. The hybrid particle mix LCM includes date palm seed particles produced from date palm seeds and scrap tire particles produced from scrap tires. The LCM may include date palm seed particles in the range of about 50 wt % to about 80% and scrap tire particles in the range of about 50 wt % to about 20 wt %. Methods of lost circulation control and manufacture of a hybrid particle mix LCM are also provided.

3 Claims, 3 Drawing Sheets

(56) References Cited

U.S. PATENT DOCUMENTS

| | | |
|---|---|---|
| 2,943,679 A | 7/1960 | Scott, Jr. |
| 2,943,680 A | 7/1960 | Scott et al. |
| 4,110,225 A | 8/1978 | Cagle |
| 4,247,403 A | 1/1981 | Foley et al. |
| 4,275,788 A | 6/1981 | Sweatman |
| 4,428,844 A | 1/1984 | Wagener |
| 4,474,665 A | 10/1984 | Green |
| 4,579,668 A | 4/1986 | Messenger |
| 4,619,772 A | 10/1986 | Black et al. |
| 4,957,166 A | 9/1990 | Sydansk |
| 5,004,553 A | 4/1991 | House et al. |
| 5,118,664 A | 6/1992 | Burts, Jr. |
| 5,197,324 A | 3/1993 | Keys |
| 5,332,724 A | 7/1994 | Burts, Jr. |
| 5,484,028 A | 1/1996 | Rose |
| 5,501,275 A | 3/1996 | Card et al. |
| 5,801,127 A | 9/1998 | Duhon, Sr. |
| 6,016,879 A | 1/2000 | Burts, Jr. |
| 6,098,712 A | 8/2000 | Burts, Jr. |
| 6,102,121 A | 8/2000 | Burts, Jr. |
| 6,271,001 B1 | 8/2001 | Clarke et al. |
| 6,350,594 B1 | 2/2002 | Clarke et al. |
| 6,518,224 B2 | 2/2003 | Wood |
| 6,716,798 B1 | 4/2004 | Burts, Jr. |
| 6,750,179 B1 | 6/2004 | Burts, Jr. |
| 6,790,812 B2 | 9/2004 | Halliday |
| 6,806,232 B1 | 10/2004 | Cart |
| 6,861,392 B2 | 3/2005 | Shaarpour |
| 6,932,158 B2 | 8/2005 | Burts |
| 7,226,895 B2 | 6/2007 | Xiang |
| 7,271,131 B2 | 9/2007 | Halliday et al. |
| 7,284,611 B2 | 10/2007 | Reddy et al. |
| 7,297,662 B2 | 11/2007 | Verret |
| 7,297,663 B1 | 11/2007 | Kilchrist et al. |
| 7,488,705 B2 | 2/2009 | Reddy et al. |
| 7,507,692 B2 | 3/2009 | Xiang |
| 7,537,054 B2 | 5/2009 | Reddy et al. |
| 7,629,297 B2 | 12/2009 | Shaarpour |
| 7,902,126 B1 | 3/2011 | Burts, Jr. |
| 7,923,413 B2 | 4/2011 | Ghassemzadeh |
| 7,964,537 B2 | 6/2011 | Rayborn, Sr. et al. |
| 8,371,381 B2 | 2/2013 | Shindgikar et al. |
| 8,383,558 B2 | 2/2013 | Reddy et al. |
| 8,404,622 B2 | 3/2013 | Ghassemzadeh |
| 8,673,825 B2 | 3/2014 | Rayborn, Sr. et al. |
| 8,739,872 B1 | 6/2014 | Miller et al. |
| 8,776,882 B2 | 7/2014 | Shindgikar et al. |
| 8,887,808 B2 | 11/2014 | Kumar et al. |
| 8,935,957 B2 | 1/2015 | Kulkarni et al. |
| 8,992,670 B1 | 3/2015 | Vohra |
| 9,140,118 B2 | 9/2015 | Kulkarni et al. |
| 9,175,529 B2 | 11/2015 | Jamison et al. |
| 9,410,066 B2 | 8/2016 | Ghassemzadeh |
| 9,416,306 B2 | 8/2016 | Savari et al. |
| 9,453,156 B2 | 9/2016 | Wu |
| 9,592,488 B2 | 3/2017 | Yusuf et al. |
| 9,623,067 B1 | 4/2017 | Awad et al. |
| 9,688,901 B2 | 6/2017 | Fontenot |
| 9,783,727 B2 | 10/2017 | Lahman et al. |
| 10,240,411 B1 | 3/2019 | Amanullah |
| 10,323,170 B1 | 6/2019 | Amanullah et al. |
| 10,329,470 B1 | 6/2019 | Amanullah et al. |
| 2002/0010100 A1 | 1/2002 | Wood |
| 2004/0023813 A1 | 2/2004 | Burts, III |
| 2004/0129460 A1 | 7/2004 | MacQuoid et al. |
| 2004/0244978 A1 | 12/2004 | Shaarpour |
| 2005/0113260 A1 | 5/2005 | Wood |
| 2005/0124502 A1 | 6/2005 | Shaarpour |
| 2005/0217852 A1 | 10/2005 | Bennett et al. |
| 2006/0106136 A1 | 5/2006 | Abu-Sharkh |
| 2006/0122069 A1 | 6/2006 | Burts, III |
| 2006/0157247 A1 | 7/2006 | Burts, III |
| 2006/0160907 A1 | 7/2006 | Stamp |
| 2009/0054269 A1 | 2/2009 | Chatterji et al. |
| 2009/0286697 A1 | 11/2009 | Shaarpour |
| 2009/0305911 A1 | 12/2009 | Pomerleau |
| 2010/0152070 A1 | 6/2010 | Ghassemzadeh |
| 2010/0181110 A1 | 7/2010 | Harr |
| 2010/0193244 A1 | 8/2010 | Hoskins |
| 2010/0230164 A1 | 9/2010 | Pomerleau |
| 2010/0230169 A1 | 9/2010 | Pomerleau |
| 2011/0214870 A1 | 9/2011 | Shaarpour |
| 2011/0278006 A1 | 11/2011 | Sanders |
| 2012/0157354 A1 | 6/2012 | Li et al. |
| 2012/0247763 A1 | 10/2012 | Rakitsky et al. |
| 2013/0025863 A1 | 1/2013 | Lin et al. |
| 2013/0206479 A1 | 8/2013 | Smith |
| 2014/0038857 A1 | 2/2014 | Miller et al. |
| 2014/0102987 A1 | 4/2014 | Yusuf et al. |
| 2014/0110177 A1 | 4/2014 | Harr |
| 2014/0135237 A1 | 5/2014 | Villarreal, Jr. et al. |
| 2014/0209290 A1 | 7/2014 | Jamison et al. |
| 2014/0231082 A1 | 8/2014 | Jamison et al. |
| 2014/0262281 A1* | 9/2014 | Kulkarni .............. C09K 8/02 166/305.1 |
| 2014/0318793 A1 | 10/2014 | Van Petergem et al. |
| 2014/0353043 A1 | 12/2014 | Amanullah et al. |
| 2015/0051120 A1 | 2/2015 | Hurd et al. |
| 2015/0072901 A1 | 3/2015 | Samuel et al. |
| 2015/0166875 A1 | 6/2015 | Bird et al. |
| 2015/0247081 A1 | 9/2015 | Dillon et al. |
| 2015/0251156 A1 | 9/2015 | Yusuf et al. |
| 2016/0060985 A1 | 3/2016 | Lin et al. |
| 2016/0096988 A1 | 4/2016 | Lin et al. |
| 2016/0177164 A1 | 6/2016 | Dillon et al. |
| 2016/0222274 A1 | 8/2016 | Hoskins |
| 2016/0222275 A1 | 8/2016 | Galindo et al. |
| 2016/0257869 A1 | 9/2016 | Kulkarni et al. |
| 2016/0289528 A1 | 10/2016 | Wagle et al. |
| 2016/0312100 A1 | 10/2016 | Amanullah et al. |
| 2017/0058180 A1 | 3/2017 | Hossain et al. |
| 2017/0137688 A1 | 5/2017 | Amanullah |
| 2017/0166795 A1 | 6/2017 | Walker et al. |
| 2017/0298263 A1 | 10/2017 | Amanullah |
| 2018/0002588 A1 | 1/2018 | Amanullah |
| 2018/0002589 A1 | 1/2018 | Amanullah |
| 2018/0016483 A1 | 1/2018 | Amanullah |
| 2018/0057729 A1 | 3/2018 | Amanullah |
| 2018/0127632 A1 | 5/2018 | Amanullah |
| 2019/0177593 A1 | 6/2019 | Amanullah |
| 2019/0177594 A1 | 6/2019 | Amanullah |
| 2019/0177595 A1 | 6/2019 | Amanullah |

FOREIGN PATENT DOCUMENTS

| | | |
|---|---|---|
| CN | 102127403 A | 7/2011 |
| CN | 203035080 U | 7/2013 |
| CN | 103740346 A | 4/2014 |
| CN | 104087274 A | 10/2014 |
| CN | 104419392 A | 3/2015 |
| GB | 2506603 A | 4/2014 |
| JP | 0671171 A | 3/1994 |
| WO | 2004013448 A2 | 2/2004 |
| WO | 2010019535 A2 | 2/2010 |
| WO | 2010088484 A2 | 8/2010 |
| WO | 2010142370 A1 | 12/2010 |
| WO | 2012037600 A1 | 3/2012 |
| WO | 2012061187 A2 | 5/2012 |
| WO | 2013039938 A1 | 3/2013 |
| WO | 2014008598 A1 | 1/2014 |
| WO | 2014197417 A1 | 12/2014 |
| WO | 2015142156 A1 | 9/2015 |
| WO | 2015199652 A1 | 12/2015 |
| WO | 2016019416 A1 | 2/2016 |
| WO | 2016028470 A1 | 2/2016 |
| WO | 2016172287 A1 | 10/2016 |
| WO | 2017087434 A1 | 5/2017 |
| WO | 2018005575 A1 | 1/2018 |

OTHER PUBLICATIONS

"Wood Shop News, Issue #08 Hard and softwoods, a unique food bank, and more news from around the shop" available as of Oct. 8, (56) References Cited

OTHER PUBLICATIONS 2018 at the website: https://www.wooden-box-maker.com/Wood_Shop_News-hardwoods-and-softwoods.html.

Alawad, Musaed N.J., et al.; "Superior fracture-seal material using crushed date palm seeds for oil and gas well drilling operations" Journal of King Saud University—Engineering Sciences (2017); pp. 1-7.

Al-Awad, Musaed NJ et al.; "Utilization of Shredded Waste Car Tyres as a Fracture Seal Material (FSM) in Oil and Gas Drilling Operations" Journal of Petroleum & Environmental Biotechnology, (2017) vol. 8, Issue 2; pp. 1-4.

Alsaba, M. et al.; "Review of lost circulation materials and treatments with an updated classification." AADE National Technical Conference and Exhibition, Houston, TX, Apr. 2014; pp. 1-9.

Amanullah, et al.; "Application of an indigenous eco-friendly raw material as fluid loss additive", Journal of Petroleum Science and Engineering, vol. 139, (2016); pp. 191-197.

Amanullah; "Characteristics, behavior and performance of ARC Plug-A date seed-based sized particulate LCM." SPE Kingdom of Saudi Arabia Annual Technical Symposium and Exhibition. Society of Petroleum Engineers, 2016; pp. 1-9.

BakerHughes.com "SOLUFLAKE Flaked Calcium Carbonate" (XP055401101) Jan. 8, 2016; p. 1.

International Search Report and Written Opinion for International Application No. PCT/US2016/062130; Report dated Jan. 27, 2017; pp. 1-12.

International Search Report and Written Opinion for International Application No. PCT/US2017/027287; report dated Sep. 13, 2017; 11 pages.

International Search Report and Written Opinion for International Application No. PCT/US2017/039614; Report dated Sep. 11, 2017; pp. 1-12.

International Search Report and Written Opinion for International Application No. PCT/US2017/039616; Report dated Sep. 11, 2017; pp. 1-11.

International Search Report and Written Opinion for International Application No. PCT/US2017/047877; Report dated Oct. 27, 2017; pp. 1-15.

International Search Report and Written Opinion for International Application No. PCT/US2017/053355; International filing date Sep. 26, 2017; Report dated Jan. 17, 2018; pp. 1-14.

International Search Report and Written Opinion for International Application No. PCT/US2017/060079; International Filing Date Nov. 6, 2017; Report dated Dec. 18, 2017; pp. 1-14.

International Search Report and Written Opinion for International Application No. PCT/US2017/067179 International Filing Date Dec. 19, 2017; Report dated Feb. 21, 2018; pp. 1-14.

International Search Report and Written Opinion for International Application No. PCT/US2017/041611; International Filing Date Jul. 12, 2017; Report dated Oct. 27, 2017 (pp. 1-15).

International Search Report and Written Opinion for International Application No. PCT/US2018/034291; International Filing Date May 24, 2018; Report dated Jul. 31, 2018 (pp. 1-11).

International Search Report and Written Opinion for International Application No. PCT/US2018/048423; International Filing Date Aug. 29, 2018; Report dated Nov. 29, 2018 (pp. 1-12).

Saudi Aramco "Local palm trees support technical solutions" Dhahran, Aug. 4, 2015; available as of Sep. 19, 2018 at the website: www.saudiaramco.com/en/home/news-media/news/local-palm-trees-support.html.

Wajheeuddin, M. et al.; "An Experimental Study on Particle Sizing of Natural Substitutes for Drilling Fluid Applications." Journal of Nature Science and Sustainable Technology vol. 8, No. 2 (2014); pp. 1-14.

Wajheeuddin, Mohammed; "Development of an Environmentally-Friendly Drilling Fluid Using Date Seeds and Grass" Master's thesis, King Fahd University of Petroleum & Minerals, 2014; pp. 1-138.

* cited by examiner

HYBRID PARTICLE MIX FOR SEAL AND PLUG QUALITY ENHANCEMENT

CROSS-REFERENCE TO RELATED APPLICATIONS

This application is a divisional of and claims priority from U.S. Non-provisional application Ser. No. 15/889,668 filed Feb. 6, 2018, and titled "ARC HYBRID PARTICLE MIX FOR SEAL AND PLUG QUALITY ENHANCEMENT," a copy of which is incorporated by reference in its entirety for purposes of United States patent practice.

BACKGROUND

Field of the Disclosure

The present disclosure generally relates to controlling lost circulation in a wellbore during drilling with a drilling fluid. More specifically, embodiments of the disclosure relate to a lost circulation material (LCM).

Description of the Related Art

Lost circulation is one of the frequent challenges encountered during drilling operations. Lost circulation can be encountered during any stage of operations and occurs when drilling fluid (such as drilling mud) pumped into a well returns partially or does not return to the surface. While some fluid loss is expected, excessive fluid loss is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. In extreme cases, lost circulation problems may force abandonment of a well.

Lost circulation can occur in various formations, such as naturally fractured formations, cavernous formations, and high permeable formations. Lost circulation can be categorized by the amount of fluid or mud lost as seepage type, moderate type, severe type, and total loss. The extent of the fluid loss and the ability to control the lost circulation with an LCM depends on the type of formation in which the lost circulation occurs. Formations with low permeability zones, that is, those with microscopic cracks and fissures, usually have seepage type lost circulation. Other formations may experience lost circulation if an improper mud weight is used while drilling.

SUMMARY

Lost circulation materials (LCMs) are used to mitigate the lost circulation by blocking the path of the drilling fluid (such as drilling mud) into the formation. The type of LCM used in a lost circulation situation depends on the extent of lost circulation and the type of formation. Different types of LCMs such as granular, fibrous and flaky materials are frequently used, either alone or in combination, to control loss of circulation. For example, different types of sized particulate lost circulation materials are used to combat loss of circulation either as a background material in the mud system or as a component of an LCM pill or a loss control slurry. The purpose of the particulate material is to assist in creation of an effective and stable seal or plug in the loss zone to maintain the integrity of the seal or plug in changing borehole conditions.

Existing particle-based LCMs may create seals or plugs with zero or negligible ductility, malleability, and resiliency. Consequently, the plugs or seals created by such LCMS often fail under changing borehole conditions, such as high surge and swabbing pressures, tectonic activities, and effective stress changes. Some existing LCMs use graphite-based resilient materials are used in LCM pills to improve the ductile, malleable and resilience behavior of set seals or plugs. However, these graphite-based materials may be expensive, may not be available locally, and may have limited ductile, malleable and resilient characteristics.

In one embodiments, a method to control lost circulation in a lost circulation zone in a wellbore is provided. The method includes introducing an altered drilling fluid into the wellbore such that the altered drilling fluid contacts the lost circulation zone and reduces a rate of lost circulation into the lost circulation zone, where the altered drilling fluid includes a drilling fluid and a lost circulation material (LCM). The LCM includes a first plurality of particles produced from date tree seeds and a second plurality of particles produced from scrap tires. In some embodiments, the altered drilling fluid consists of the drilling fluid and the LCM. In some embodiments, the LCM consists of the first plurality of particles produced from date tree seeds and the second plurality of particles produced from scrap tires. In some embodiments, the first plurality of particles present in an amount in the range of 50% by weight to 80 by weight and the second plurality of particles present in an amount in the range of 50% by weight to 20% by weight. In some embodiments, the LCM has a concentration of at least 20 pounds-per-barrel (ppb) in the altered drilling fluid. In some embodiments, each of the first plurality of particles produced from date tree seeds has a diameter in the range of 500 microns to 4000 microns. In some embodiments, each of the second plurality of particles produced from scrap tires has a diameter in the range of 2000 microns to 8000 microns. In some embodiments, the first plurality of particles include a first plurality of untreated particles produced from untreated date tree seeds.

In another embodiments, an altered drilling fluid is provided that includes a drilling fluid and a lost circulation material (LCM). The LCM includes a first plurality of particles produced from date tree seeds and a second plurality of particles produced from scrap tires. In some embodiments, the LCM consists of the first plurality of particles produced from date tree seeds and the second plurality of particles produced from scrap tires. In some embodiments, the first plurality of particles present in an amount in the range of 50% by weight to 80% by weight and the second plurality of particles present in an amount in the range of 50% by weight to 20% by weight. In some embodiments, the LCM having a concentration of at least 20 pounds-per-barrel (ppb) in the altered drilling fluid. In some embodiments, each of the first plurality of particles produced from date tree seeds has a diameter in the range of 500 microns to 4000 microns. In some embodiments, each of the second plurality of particles produced from scrap tires has a diameter in the range of 2000 microns to 8000 microns.

In another embodiment, a lost circulation material (LCM) composition is provided. The LCM composition includes a first plurality of particles produced from date tree seeds and a second plurality of particles produced from scrap tires. In some embodiments, the LCM consists of the first plurality of particles from date tree seeds and the second plurality of particles produced from scrap tires. In some embodiments, the first plurality of particles present in an amount in the range of 50% by weight to 80% by weight and the second plurality of particles present in an amount in the range of 50% by weight to 20% by weight. In some embodiments, each of the first plurality of particles produced from date tree seeds has a diameter in the range of 500 microns to 4000 microns. In some embodiments, each of the second plurality of particles produced from scrap tires has a diameter in the range of 2000 microns to 8000 microns. In some embodiments, the first plurality of particles including a first plurality of untreated particles produced from untreated date tree seeds.

In another embodiment, a method of forming a lost circulation material (LCM) is provided. The method includes processing date tree seeds to produce a first plurality of particles, processing scrap tires to produce a second plurality of particles, and mixing a first amount of the first plurality of particles and a second amount of the second plurality of particles to form the LCM. In some embodiments, processing the date tree seeds to produce the first plurality of particles includes grinding the date tree seeds. In some embodiments, each of the first plurality of particles has a diameter in the range of 500 microns to 4000 microns. In some embodiments, processing the scrap tires to produce the second plurality of particles includes shredding the scrap tires and grinding the shredded scrap tires to produce the second plurality of particles. In some embodiments, the first plurality of particles present in an amount in the range of 50% by weight to 80% by weight and the second plurality of particles present in an amount in the range of 50% by weight to 20% by weight. In some embodiments, each of the second plurality of particles produced from scrap tires has a diameter in the range of 2000 microns to 8000 microns.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

As a wellbore is drilled, a drilling fluid is continuously pumped into the wellbore to clear and clean the wellbore and the filings. The drilling fluid is pumped from a mud pit into the wellbore and returns again to the surface. A lost circulation zone is encountered when the flow rate of the drilling fluid that returns to the surface is less than the flow rate of the drilling fluid pumped into the wellbore. It is this reduction or absence of returning drilling fluid that is referred to as lost circulation.

Embodiments of the disclosure include a particle mix LCM (referred to as a "hybrid particle mix" LCM) that includes a mix of date palm seed particles obtained from date palm seeds and scrap tire particles obtained from scrap tires. The hybrid particle mix LCM may mitigate or prevent lost circulation in a well, as well as provide seepage control and minimize or prevent fluid loss. As used in the disclosure, the term date palm seeds refers to the seeds produced from date trees (also referred to as "date palms"), such as used in the production of date fruits (also referred to as "dates").

With the foregoing in mind, a hybrid particle mix LCM may include particles formed from ground date tree seeds and particles formed from ground scrap tires. In some embodiments, the particles formed from ground scrap tires may include crumb rubber. In some embodiments, the hybrid particle mix LCM may include date palm seed particles in the range of about 50% by weight (wt %) to about 80% and scrap tire particles in the range of about 50 wt % to about 20 wt %. In some embodiments, the hybrid particle mix LCM includes 64 wt % date palm seed particles and 36 wt % scrap tire particles. In some embodiments, the resulting hybrid particle mix may have a bimodal particle size distribution.

The presence of two types of particles with different properties may enable the hybrid particle mix LCM to form a structure (for example, a seal or plug) in subsurface conditions that can adsorb strain energy when deformed elastically under the in-situ conditions and desorb strain energy when the subsurface in-situ conditions change with changing wellbore conditions. For example, the date palm seed particles by more rigid as compared to the scrap tire particles, while the scrap tire particles may be more ductile, malleable, and resilient as compared to the date palm seed particles. The combination of both particles in the hybrid particle mix may enable the in-situ formation of a seal or plug that has improved malleability, ductility, and resiliency as compared to existing LCMs. The combination of both particles in the hybrid particle mix may further enable the formation of a seal or plug having improved seal hardening characteristics as compared to existing LCMs, such as by improving the plastic deformation characteristics that enables particle dislocation, readjustment, realignment, resetting, and the like without macroscale failure of the set plug or seal. Finally, the combination of both particles in the hybrid particle mix may further enable the formation of a seal or plug having improved stability as compared to existing LCMs, such as by decreasing the radial stress effect due to the improved resilient, ductile and malleable characteristics of the set seal and plug and improved resistance to internal cracking and fracturing.

Hybrid Particle Mix LCM Manufacture and Use

In some embodiments, a hybrid particle mix LCM includes date palm seed particles and scrap tire particles. The date palm seed particles include particles manufactured from date palm seeds. The date palm seeds may be obtained from pruning waste and date processing plants to provide a sustainable source of material for the hybrid particle mix LCM. Moreover, local sources of date tree waste may reduce the cost of imported LCM products, components, or both. The date palm seeds may be obtained from the species

*Phoenix dactylifera*. It should be appreciated that, in some embodiments, the date palm seeds may be obtained from genetically modified date trees (that is, genetically modified organisms (GMOs)). In some embodiments, the date palm seeds may be prepared by cleaning the date palm seeds before use or processing, such as by washing the date palm seeds.

The scrap tire particles may be obtained from scrap tires (also referred to as "waste tires"). The scrap tires may be obtained from tire recycling facilities, tire disposal locations, and the like. The scrap tires may be shredded and ground to produce the scrap tire particles. In some embodiments, unwanted components (for example, metallic components) may be separated from the scrap tires during processing (for example, via a magnetic separator).

In some embodiments, the date palm seed particles may include particles having the following particle size distribution, as determined by the diameters of the particles passed or retained in mesh openings: about 4000 microns ($\mu$m) to about 2000 microns (that is, particles passing through sieve mesh size no. 5 and retained in sieve mesh size no. 10), about 2000 microns to about 1000 microns (that is, particles passing through sieve mesh size no. 10 and retained in sieve mesh size no. 18), and about 1000 microns to about 500 microns (that is, particles passing through sieve mesh size no. 18 and retained in sieve mesh size no. 35).

In some embodiments, the scrap tire particles may include particles having the following particle size distribution, as determined by the diameters of the particles passed or retained in mesh openings: about 8000 microns to about 4000 microns (that is, particles passing through sieve mesh size no. 5/16 and retained in sieve mesh size no. 5) and about 4000 microns to about 2000 microns (that is, particles passing through sieve mesh size no. 5 and retained in sieve mesh size no. 10).

In some embodiments, the hybrid particle mix LCM may include date palm seed particles in the range of about 50% by weight (wt %) to about 80% and scrap tire particles in the range of about 50 wt % to about 20 wt %. In some embodiments, the hybrid particle mix LCM includes 64 wt % date palm seed particles and 36 wt % scrap tire particles.

In some embodiments, the date palm seeds may include untreated date palm seeds to preserve the environmentally-friendly and biodegradable properties of the manufacturing process, the date palm seeds, and the resulting LCM composition. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass grinding or heating to remove moisture but does encompass chemical or other processes that may change the characteristics or properties of the particles. In such embodiments, the date palm seed particles may be manufactured without treating before, during, or after crushing, grinding, drying, or any other processing.

In some embodiments, the hybrid particle mix LCM may be added directly to a drilling fluid, such as a drilling mud, to create an altered drilling fluid having the hybrid particle mix LCM. For example, in some embodiments, the hybrid particle mix LCM may be added to (for example, blended with) an oil-based drilling mud or a water-based drilling mud. In some embodiments, the hybrid particle mix LCM may be added at the mud pit of a mud system. In some embodiments, the hybrid particle mix LCM may be added to a drilling fluid in an amount in the range of about 20 parts-per-billion mass (ppb) to about 50 ppb. After addition of the hybrid particle mix LCM to a drilling fluid, the altered drilling fluid may be circulated at a pump rate effective to position the altered drilling fluid into contact with a lost circulation zone in a wellbore, such that the hybrid particle mix LCM alters the lost circulation zone (for example, by entering and blocking porous and permeable paths, cracks, and fractures in a formation in the lost circulation zone, such as forming a structure (for example, a plug or seal) in a mouth or within a fracture).

As noted in the disclosure, the properties of the hybrid particle LCM may prevent damage or degradation of the structures (for example, plugs and seals) formed from the hybrid particle mix LCM under changing subsurface conditions after placement downhole in a lost circulation zone. Additionally, in contrast to fluid loss additives used to prevent fluid loss in drilling fluids, the hybrid particle LCM may prevent the loss of whole mud in lost circulation zones.

Figure 1:
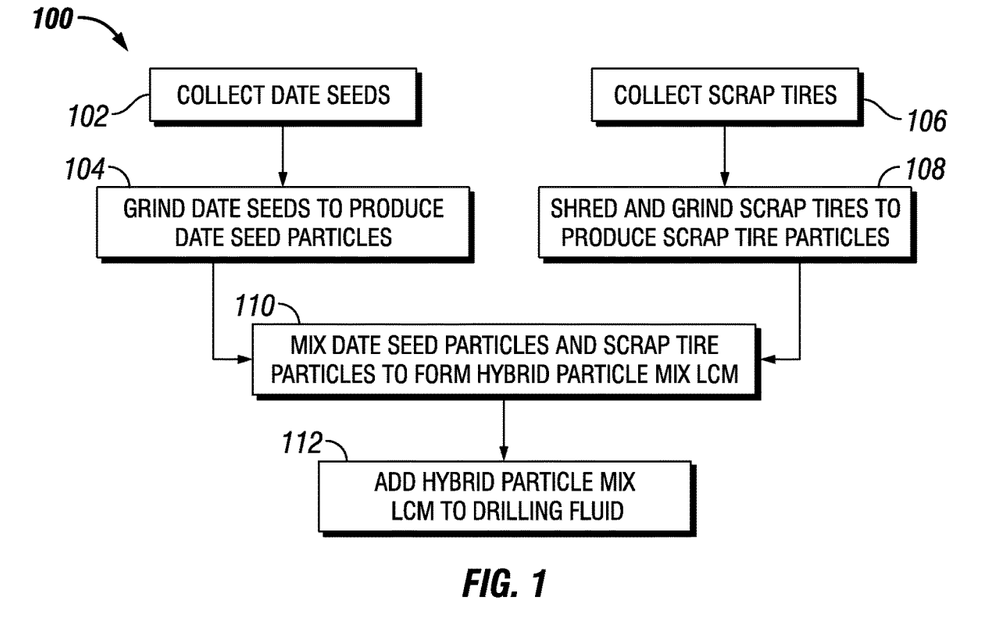
FIG. 1 is a process for the production and use of a hybrid particle mix LCM formed from date palm seed particles and scrap tire particles in accordance with an embodiment of the disclosure.

FIG. 1 depicts a process 100 for the production and use of a hybrid particle mix LCM in accordance with an example embodiment of the disclosure. As shown in FIG. 1, date tree seeds may be collected (block 102), such as from date tree waste produced by date tree farming and date processing industries. In some embodiments the date palm seeds may be cleaned, such as by a high pressure water or air jet, to remove dirt, dust, and other foreign substances. The collected date palm seeds may be ground to produce particles from the date palm seeds (block 104). In some embodiments, the collected date palm seeds may be ground using a suitable commercial grinder that produces a specific range of particle sizes (for example, particles having a specific range of particle diameters).

As also shown in FIG. 1, scrap tires may be collected, such as from tire recycling facilities or tire disposal locations (block 106). In some embodiments, tires may be collected and transported to another facility for processing as described in the disclosure. In some embodiments the tires may be cleaned, such as by a high pressure water or air jet, to remove dirt, dust, and other foreign substances. The collected tires may be shredded and ground to produce particles from the scrap tires (block 108). In some embodiments, the collected scrap tires may be ground using a suitable commercial grinder that produces a specific range of particle sizes (for example, particles having a specific range of particle diameters). In some embodiments, unwanted components (for example, metallic components) may be separated from the scrap tires during processing (for example, via a magnetic separator).

The date palm seed particles and the scrap tire particles may then be mixed to form a hybrid particle mix having both particles (block 110). In some embodiments, the mix of date palm seed particles and the scrap tire particles may be packed for transportation and use. In some embodiments, a suitable amount of packed mixed particles may then be transported to an oil and gas operations site for use as an LCM.

The hybrid particle mix LCM may be added directly to a drilling fluid (block 112), such as a drilling mud, to create an altered drilling fluid having the hybrid particle mix LCM. For example, in some embodiments, the hybrid particle mix LCM may be added to (for example, blended with) an oil-based drilling mud or a water-based drilling mud. In some embodiments, the hybrid particle mix LCM may be added at the mud pit of a mud system. After addition of the hybrid particle mix LCM to a drilling fluid, the altered drilling fluid may be circulated at a pump rate effective to position the drilling fluid into contact with a lost circulation zone in a wellbore, such that the hybrid particle mix LCM alters the lost circulation zone (for example, by entering and blocking porous and permeable paths, cracks, and fractures in a formation in the lost circulation zone). As previously stated, the hybrid particle mix LCM may form resilient structures (for example, plugs or seals) at openings of paths, cracks, and fractures in a loss zone. In some embodiments, the reduced rate of lost circulation may be negligible. In some embodiments, the hybrid particle mix LCM may be introduced via an open ended drill pipe to place the LCM in the lost circulation zone.

In other embodiments, the hybrid particle mix LCM and one or more additional LCMs may be added to a drilling fluid, such as a drilling mud, to create an altered drilling fluid having the LCMs. For example, in some embodiments, the hybrid particle mix LCM and one or more additional LCMs may be added to an oil-based drilling mud or a water-based drilling mud. In other embodiments, the hybrid particle mix LCM may be added to a cement slurry for use in a cementing operation.

In some embodiments, the hybrid particle mix LCM may be mixed with a carrier fluid, a viscosifier, or both. In some embodiments, a hybrid particle mix LCM homogenous suspension, slurry, or pill may be formed. For example, a specific carrier fluid, viscosifier, or combination thereof may be selected to form a homogenous suspension, slurry, or pill having the hybrid particle mix LCM. The homogenous suspension or pill may be added to a drilling fluid and used in the manner similar to the hybrid particle mix LCM described in the disclosure.

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The following non-limiting examples of a hybrid particle mix LCM were prepared and evaluated against a 100% date palm seed formulation and a 100% scrap tire particle formulation. The hybrid particle mix LCM was prepared by combining 64% by weight date palm seed particles and 35% by weight scrap tire particles with different particle size distribution (PSD) to provide a bimodal particle size distribution in the resultant hybrid particle mix LCM. The date palm seed particles and scrap tire particles were mixed together using a low shear mixing apparatus to form a homogenous mix of particles while maintaining the particle size distribution without damaging or degrading the particles.

The date palm seed particles had the following particle size distribution (PSD), as determined by the diameters of the particles passed or retained in mesh openings: about 4000 microns (µm) to about 2000 microns (that is, particles passing through sieve mesh size no. 5 and retained in sieve mesh size no. 10), about 2000 microns to about 1000 microns (that is, particles passing through sieve mesh size no. 10 and retained in sieve mesh size no. 18), and about 1000 microns to about 500 microns (that is, particles passing through sieve mesh size no. 18 and retained in sieve mesh size no. 35).

The scrap tire particles had the following particle size distribution (PSD), as determined by the diameters of the particles passed or retained in mesh openings: about 8000 microns to 4000 microns (that is, particles passing through sieve mesh size no. 5/16 and retained in sieve mesh size no. 5) and about 4000 microns to about 2000 microns (that is, particles passing through sieve mesh size no. 5 and retained in sieve mesh size no. 10).

As shown by the particle size distributions, at surface conditions the scrap tire particles had an overlapping particle size that was equal to one size range of the date palm seed particles. However, the scrap tire particle size may be significantly reduced at subsurface conditions due to pressure. This allows easy infiltration of the scrap tire particles into the date palm seed particle matrix under the pressure downhole, enabling the scrap tire particles to act as a filler material. Due to the relatively greater resiliency of the scrap tire particles as compared to the date palm seed particles, the seal or plug formed by the hybrid particle mix LCM may maintain integrity and fit when the pressure is reduced or removed.

Figure 2:
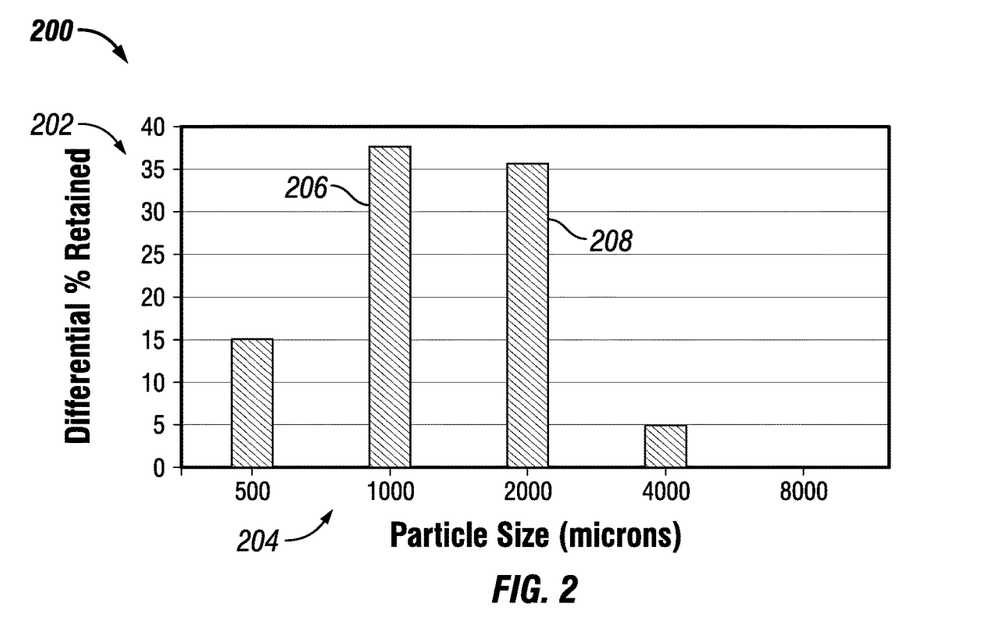
FIG. 2 is a bar graph of the particle size distribution of an example hybrid particle mix in accordance with an embodiment of the disclosure.

As mentioned supra, the example hybrid particle mix LCM prepared from the date palm seed particles and scrap tire particles with the described particle size distributions had a bimodal particle size distribution. FIG. 2 is a bar graph 200 of the particle size distribution of the example hybrid particle mix in accordance with an embodiment of the disclosure. As shown in FIG. 2, the y-axis 204 depicts the differential % of particles retained and the x-axis 206 depicts the particle size (in microns). The particle size distribution illustrates a bimodal particle size distribution a first mode (illustrated by bar 206) at about 1000 microns and a second mode (illustrated by bar 208) at about 2000 microns.

The example hybrid particle mix LCM was evaluated to determine the improvement to the ductility, malleability, and resiliency provided by the example hybrid particle mix. The example hybrid particle mix LCM, a date palm seed particle formulation having 100% date palm seed particles, and a scrap tire particle formulation having 100% scrap tire particles were tested using a resilience testing apparatus, such as is described in U.S. application Ser. No. 15/802,870, now U.S. Publication No. 20190137371. For example, a suitable resilience testing apparatus may include a cylindrical test cell with an open end and a closed end and a probe with a disc piston that applies a load on a sample placed in the test cell. A movement mechanism may be attached to a carrier arm that applies a load to the sample in the test cell by moving the probe and compressing the sample. The resilience testing apparatus may be coupled to a computer to monitor and control the test parameters (such as strain percentage applied to the sample) and determine various test results.

Figure 3:
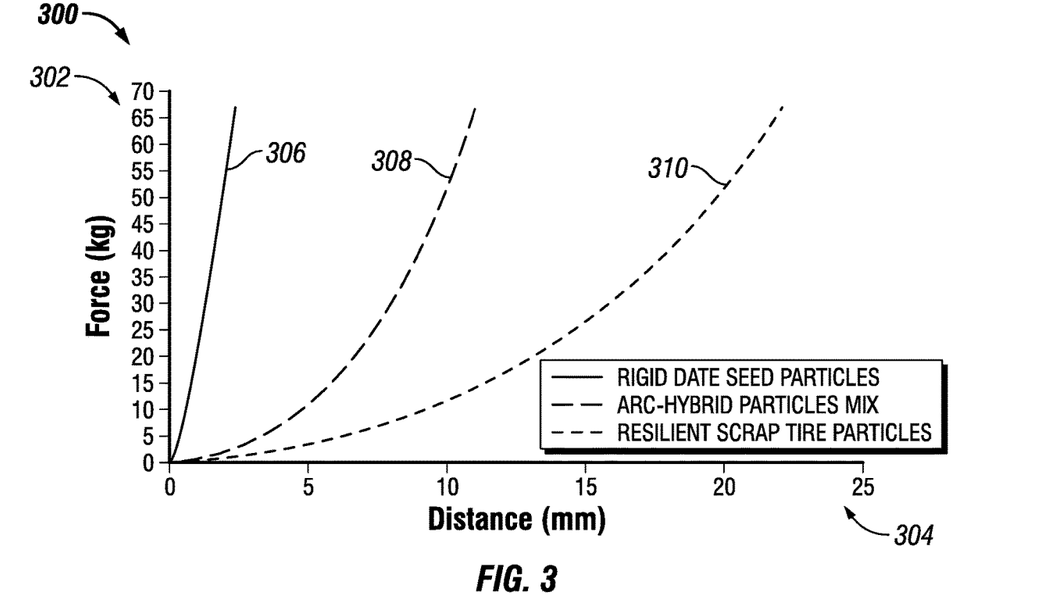
FIG. 3 is a graph of the load-displacement behavior of an example hybrid particle mix, a 100% date palm seed particle formulation, and a 100% scrap tire particle formulation resulting from a compression test in accordance with an embodiment of the disclosure.

The load-displacement behavior of the hybrid particle mix LCM and the other formulations was determined at a displacement rate of 1 millimeter (mm) per second (sec). FIG. 3 depicts a graph 300 of the load-displacement behavior of the hybrid particle mix LCM, the date palm seed particle formulation, and the scrap tire particle formulation.

As shown in FIG. 3, the y-axis 302 depicts force (in kilograms (kg)) and the x-axis 304 depicts distance (mm). As shown in the graph 300, the line 306 corresponds to the date palm seed particle formulation, line 308 corresponds to the example hybrid particle mix formulation, and line 310 corresponds to the scrap tire particle formulation. As shown in FIG. 3, the steep slope of the line 306 corresponding to the date palm seed particle formulation indicates the lack of or negligible malleability of the 100% date palm seed particle formulation. In contrast, the progressive rise of the line 310 corresponding to the scrap tire particle formulation with the large displacement at the top of the line 310 to register the same force (load) as the other tested compositions indicate large malleability of the scrap tire particles. Accordingly, mixing proportions of the date palm seed particles and scrap tire particles may produce a hybrid particle mix with intermediate malleability as compared to either of the particles alone. Thus, as shown in FIG. 3, the line 308 corresponding to the hybrid particle mix LCM shows a load-displacement behavior in-between the date palm seed particle formulation and scrap tire particle formulation. The line 308 thus illustrates the malleability of the hybrid particle mix LCM due to the mix of particles and may be expected to improve the stability of seals and plugs formed from the LCM under changing subsurface conditions.

The material stiffness (also referred to as "compression") for the hybrid particle mix LCM, the 100% date palm seed particle formulation, and the 100% scrap tire formulation was determined from a linear fit to the most linear portion of the curves 308, 306, and 310 respectively of FIG. 3. Table 1 shows the determined material stiffness for each formulation:

TABLE 1

MATERIAL STIFFNESS DETERMINED FROM
LOAD-DISPLACEMENT CURVES

| Samples | Cut off Load (grams-force ((gf)) | Stiffness (kg/mm) | Correlation Coefficient |
|---|---|---|---|
| 100% Date palm seed particle | 67250.551 | 31.463 | 0.999 |
| Hybrid Particle mix | | 5.293 | 0.993 |
| 100% Scrap tire particles | | 2.156 | 0.997 |

In a second experiment, the load-displacement behaviors of the hybrid particle mix LCM, the 100% date palm seed particle formulation, and the 100% scrap tire formulation were evaluated using the resilience testing apparatus and a compression cycle and a decompression cycle. The test was conducted at a 10% strain using the following test procedure:

1. Place a sufficient amount of the test sample into the test cell so that the sample top is 2 centimeters (cm) below the open end of the test cell and level;
2. Set the circular foot of the probe above the top of the test sample and set a trigger force of 3 gf that initiates data recording;
3. Compress the test sample until the specified strain percentage is reached at a displacement rate of 1 mm/sec (referred to as a "compression cycle");
4. Record the total energy stored at the end of the compression cycle;
5. Hold the probe in pace for 1 minute;
6. Withdraw the probe at a rate of 1 mm/sec until the probe is completely withdrawn from the test sample (referred to a "decompression cycle");
7. Record the total energy released at the end of the decompression cycle; and
8. Determine the coefficient of resilience by dividing the desorbed strain energy released during the decompression cycle by the absorbed strain energy stored during the compression cycle of the test.

Figure 4:
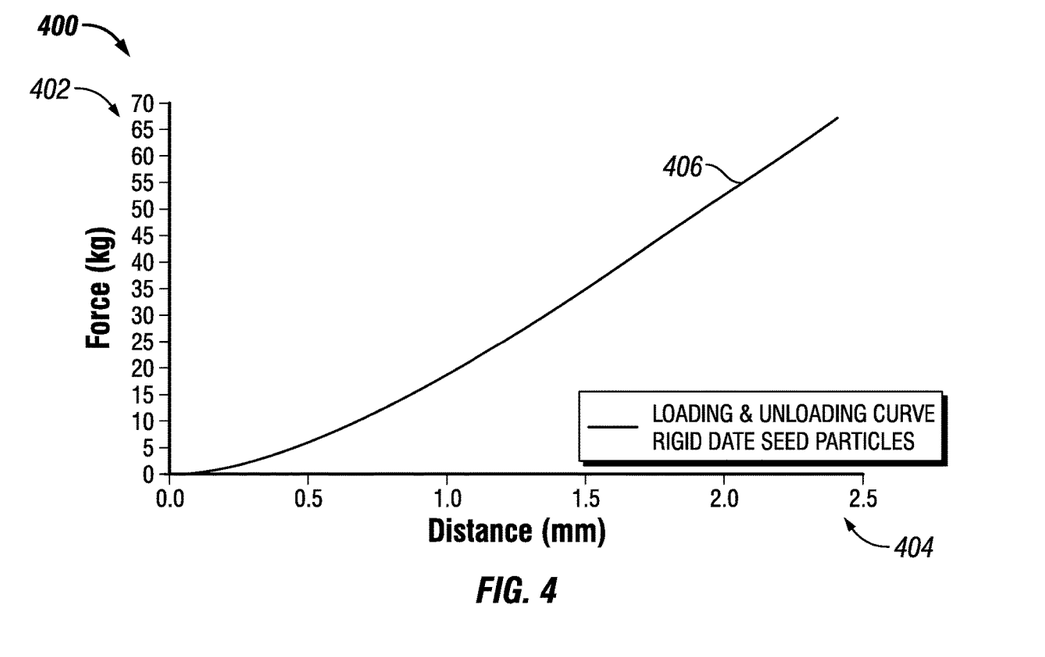
FIG. 4 is a graph of the load-displacement behavior of a 100% date palm seed particle formulation resulting from a resiliency test in accordance with an embodiment of the disclosure.

FIG. 4 depicts graph 400 of the results of the resilience test of the 100% the date palm seed particle formulation. As shown in FIG. 4, the y-axis 402 depicts force (in kilograms (kg)) and the x-axis 404 depicts distance (mm). The graph 400 illustrates a compression curve 406 generating during a compression cycle of the resilience test. The compression cycle of the resilience test of the 100% date palm seed particle formulation was automatically terminated for exceeding the capacity of the resilience test equipment. The graph 400 does not include a decompression curve as the 100% date palm seed particle formulation did not exhibit any springing or bouncing back during the decompression cycle of the resilience test.

Figure 5:
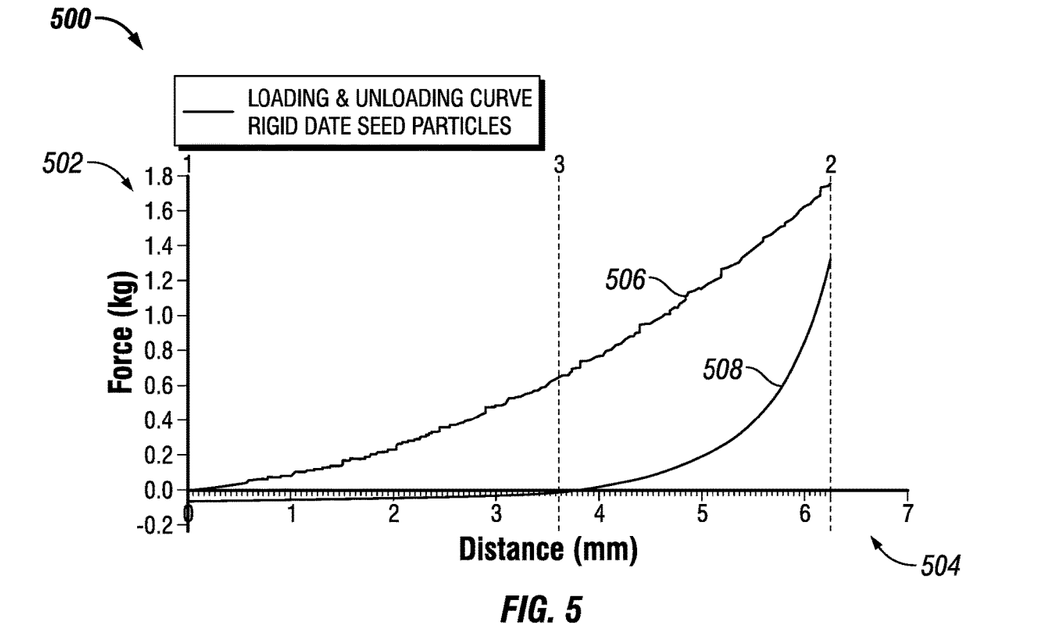
FIG. 5 is a graph of the load-displacement behavior of a 100% scrap tire particle formulation resulting from a resiliency test in accordance with an embodiment of the disclosure.

FIG. 5 depicts graph 500 of the results of a resilience test of the 100% scrap tire particle formulation. As shown in FIG. 5, the y-axis 502 depicts force (in kg) and the x-axis 504 depicts distance (in mm). The graph 500 illustrates a compression curve 506 generating during a compression cycle of the resilience test and a decompression curve 508 generating during a decompression cycle of the test. As will be appreciated, the areas below the compression curve 506 and the decompression curve 508 may be used to determine a coefficient of resilience according to the following Equation 1:

$$COR = \frac{Ad}{Ac} \quad (1)$$

Where COR is the coefficient of resilience, Ad is the area under the decompression curve, and Ac is the area under the compression curve.

Figure 6:
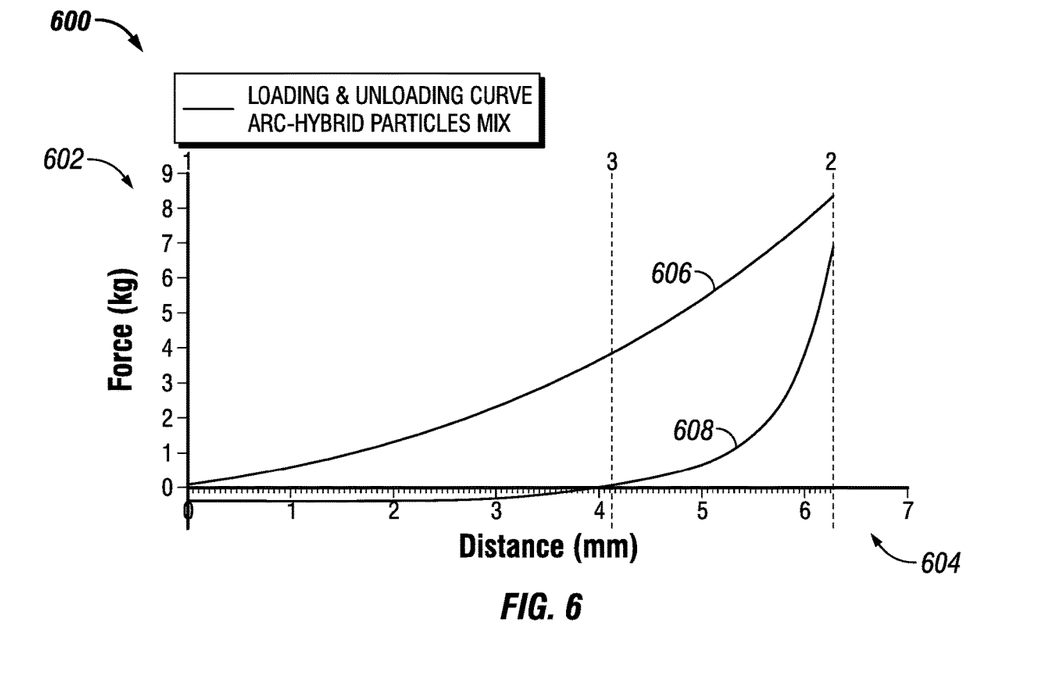
FIG. 6 is a graph of the load-displacement behavior of a hybrid particle mix resulting from a resiliency test in accordance with an embodiment of the disclosure.

FIG. 6 depicts graph 600 of the results of a resilience test of the hybrid particle mix formulation. As shown in FIG. 6, the y-axis 602 depicts force (in kg) and the x-axis 604 depicts distance (in mm). The graph 600 illustrates a compression curve 606 generating during a compression cycle of the resilience test of the hybrid particle mix formulation and a decompression curve 608 generating during a decompression cycle of the test. As discussed supra, Equation 1 may be used to determine a coefficient of resilience based on the areas under the compression curve 606 and the decompression curve 608.

Table 2 shows the results of the resiliency test for the hybrid particle mix LCM, the 100% date palm seed particle formulation, and the 100% scrap tire formulation, and the coefficient of resiliency determined for the 100% scrap tire formulation and the hybrid particle mix formulation:

TABLE 2

RESULTS OF RESILIENCY TEST AND DETERMINED COEFFICIENT OF RESILIENCE

| Test Sample | Peak load (kgf) | Distance traveled at 10% strain | Area A (Area below compression curve, kgf-mm) | Area B (Area below decompression curve, kgf-mm) | Coefficient of Resiliency |
|---|---|---|---|---|---|
| 100% Date palm seed particle | 67.67 | 2.5 (test automatically terminated for exceeding equipment capacity) | 51.801 | N/A | N/A |
| 100% Scrap tire particles | 1.77 | 6.26 | 3.994 | 3.690 | 0.924 |
| Hybrid particle mix | 8.42 | 6.29 | 19.192 | 14.832 | 0.773 |

As shown in Table 2, the hybrid particle mix has a coefficient of resilience greater than 0.5, indicating a significant amount of resiliency. The resiliency characteristics of the hybrid particle mix show the capability of the formulation as an LCM having improved seal and plug stability under changing subsurface conditions. The test result data in Table 2 also demonstrates that the resiliency of a hybrid particle mix may be increased by increasing the percentage of scrap tire particles in the formulation.

In a third experiment, the sealing and plugging capability of the hybrid particle mix was evaluated using a 2 millimeter (mm) slotted disc and a Permeability Plugging Tester (also referred to as "PPT" or "Pore Plugging Test" apparatus) manufactured by OFI Testing Equipment, Inc., of Houston, Tex., USA. The tests were conducted at conditions of about 212° F. and about 500 psi differential pressure. For the plugging efficiency tests, the hybrid particle mix formulation was incorporated into a 65 pounds per cubic foot (pcf) bentonite mud. The composition of the 65 pcf bentonite mud with mud components expressed in pounds-per-barrels (lb/bbl) is shown in Table 3:

TABLE 3

COMPOSITION OF 65 PCF BENTONITE MUD

| Mud Component | lb/bbl |
|---|---|
| Water | 340.67 |
| Bentonite | 25.00 |
| Caustic Soda | 0.25 |
| Soda Ash | 0.25 |

The test was conducted using the Permeability Plugging Tester apparatus and the following plugging efficiency test procedure:

1. Set the temperature controller/thermostat to the testing temperature;
2. Check the condition of the O-rings in the groove at the top of the test cell of the Permeability Plugging Tester apparatus and in the cell end cap and replace the O-rings if needed;
3. Apply a thin coating of high temperature grease to all the O-rings, including the two O-rings on the piston of the Permeability Plugging Tester apparatus;
4. Screw the T-bar of the Permeability Plugging Tester apparatus into the piston, install into the bottom end of the test cell, position the piston about 1 inch into the cell bore, and remove the T-bar;
5. Add a volume of hydraulic oil to the test cell using the hydraulic hand pump of the Permeability Plugging Tester apparatus;
6. Install all the O-rings and secure the end cap of the cell in position such that oil flows from the hole in the end cap to ensure no air is trapped;
7. Install the valve stem into the bottom end cap of the cell, tighten the valve stem, and disconnect from the hydraulic hand pump of the Permeability Plugging Tester apparatus;
8. Place the cell upright on a suitable stand;
9. Pour a test sample of a homogenous mixture of 275 milliliters (ml) of the 65 pcf bentonite mud and 30 grams of an LCM into the test cell;
10. Install an O-ring into the top of the cell below the 2 mm slotted disc;
11. Place the 2 mm slotted disc on top of the O-ring;
12. Insert the end cap on the top of the disc, screw down the threaded retaining ring, and fully tighten;
13. Tighten the top stem of the test cell;
14. Place the cell into the heating jacket of the Permeability Plugging Tester apparatus;
15. Connect a pressure hose from the hydraulic hand pump to the bottom of the test cell via a quick connector and ensure the bottom stem is closed;
16. Connect the back pressure hose/sample collector to the top stem of the test cell, ensuring that the locking pin is in place, close the pressure relief valve on the side of the hydraulic hand pump, apply the testing pressure via the back pressure regulator to the top of the test cell, and close the top valve.
17. Place a thermometer into the hole at the top of the test cell. wait until the testing temperature is reached, and monitor the cell pressure while heating and bleed off pressure if necessary by opening the pressure relived valve on the side of the hydraulic hand pump;
18. Once the test sample has reached the testing temperature, pump the hydraulic hand pump until the pump gauge shows the testing pressure plus the required back pressure;

19. Apply the required back pressure to the top of the cell, open the top valve, and pump the hydraulic hand pump to reestablish the testing pressure;

20. To determine the spurt volume, collect the fluid from the back pressure collector in a measuring cylinder and record the amount, ensuring that all the fluid has been expelled;

21. Collect the fluid periodically over a 30 minute time period and check the back pressure gauge to ensure that the pressure remains less than the pressure threshold (about 3000 psi) of the built-in safety disc of the Permeability Plugging Tester apparatus and avoid expulsion of hot hydraulic oil;

22. Record the spurt loss, total leak off, and PPT values over the 30 minute time period and record the cake thickness after dismantling the test cell.

Table 4 shows the results of plugging efficiency tests for the hybrid particle mix formulation at 20 pounds-per-barrel (ppb) concentrations in the 65 pcf bentonite mud, with the spurt loss, fluid loss, total leak off, and PPT value measured in cubic centimeters (cc) and the cake thickness measured in mm:

TABLE 4

PLUGGING EFFICIENCY TEST RESULTS FOR HYBRID PARTICLE MIX LCM

| Mud System | LCM | Concentration | Spurt Loss | Fluid Loss | Total Leak-off | PPT Value |
|---|---|---|---|---|---|---|
| 65 pcf Bentonite Mud | Hybrid Particle Mix | 20 ppb | 9 ml | 0 | 9 ml | 18 ml |

As shown in Table 4, the plugging efficiency tests show that after an initial sport loss of 9 ml of mud through the slots of the PPT disc, the hybrid particle mix formulation was able to completely stop the loss of whole mud and exhibited zero fluid loss at 20 ppb. The test demonstrates that the hybrid particle mix is capable of effectively reducing or eliminating loss circulation due to the combined characteristics of the date palm seed particles and the scrap tire particles. Moreover, a structure (for example, a plug or seal) formed by the hybrid particle mix will have resilient characteristics that enable the plug or seal to reform from or avoid permanent damage or degradation to the plug or seal under changing subsurface conditions.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method of forming a lost circulation material (LCM), comprising:
    processing date tree seeds to produce a first plurality of particles;
    processing scrap tires to produce a second plurality of particles;
    mixing a first amount of the first plurality of particles and a second amount of the second plurality of particles to form the LCM,
    wherein each of the first plurality of particles has a diameter in the range of 1000 microns to 4000 microns and each of the second plurality of particles produced from scrap tires has a diameter in the range of 2000 microns to 8000 microns,
    wherein the first plurality of particles comprise an amount in the range of 50% by weight to 80% by weight and the second plurality of particles comprise an amount in the range of 50% by weight to 20% by weight,
    wherein the LCM has a coefficient of resiliency of at least 0.5 and prevents the loss of whole mud in a lost circulation zone in a wellbore.

2. The method of claim 1, wherein processing the date tree seeds to produce the first plurality of particles comprises grinding the date tree seeds.

3. The method of claim 1, wherein processing the scrap tires to produce the second plurality of particles comprises:
    shredding the scrap tires; and
    grinding the shredded scrap tires to produce the second plurality of particles.

* * * * *